United States Patent [19]

Cebollero

[11] Patent Number: 4,778,160
[45] Date of Patent: Oct. 18, 1988

[54] SPRING FOR HINGES OF AUTOMOTIVE VEHICLE SUN SHADES

[75] Inventor: Carlos G. Cebollero, Barcelona, Spain

[73] Assignee: Industrias Techno-Mattic S.A., Barcelona, Spain

[21] Appl. No.: 19,522

[22] Filed: Feb. 26, 1987

[30] Foreign Application Priority Data

Mar. 1, 1986 [ES] Spain ............................. 292644

[51] Int. Cl.$^4$ ..................... F16F 1/18; B60J 3/00
[52] U.S. Cl. ................................ 267/158; 296/97.1
[58] Field of Search ............... 267/158, 160; 296/96, 296/97 H, 97 K; 403/165, 365; 16/342, 223, 255; 384/226; D12/191; D8/323; 350/361

[56] References Cited

U.S. PATENT DOCUMENTS

| 4,518,192 | 5/1985 | Canadas et al. ......... 296/97 K X |
| 4,602,888 | 7/1986 | Court et al. ............. 267/158 X |
| 4,626,019 | 12/1986 | Tung et al. ............... 296/97 H |

FOREIGN PATENT DOCUMENTS

| 2450709 | 11/1980 | France ..................... 296/97 H |
| 2491402 | 4/1982 | France ..................... 296/97 H |
| 0140222 | 8/1982 | Japan ...................... 296/97 H |

Primary Examiner—Andres Kashnikow
Assistant Examiner—Robert J. Oberleitner
Attorney, Agent, or Firm—Michael J. Striker

[57] ABSTRACT

A spring for hinges of automotive vehicle sun shades comprises a body part which is formed as a one-piece member, the member being bent over three edges so as to form four portions, two of the portions having free ends which face toward one another and are spaced from one another so as to form separate flexible wings, one of the flexible wings being provided with formations for facilitating insertion of a supporting shaft, the other of the flexible wings being provided with formations for engaging with an outer structure.

9 Claims, 1 Drawing Sheet

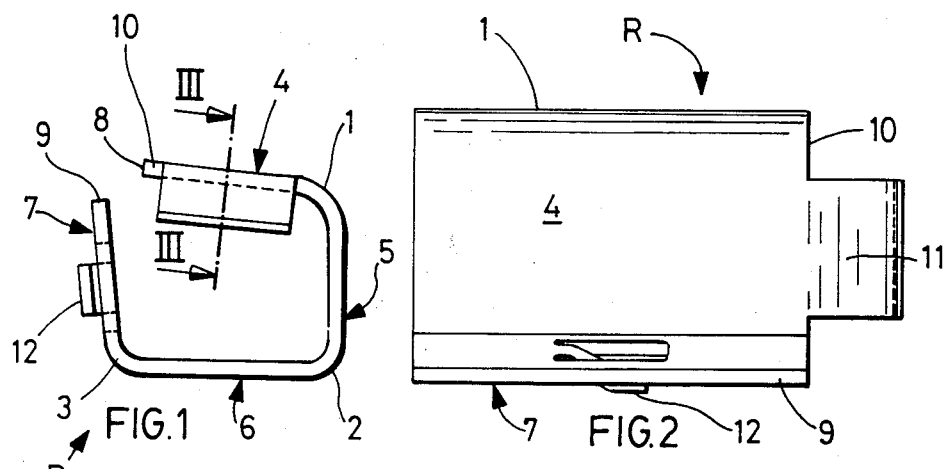
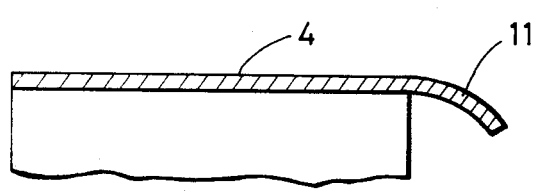
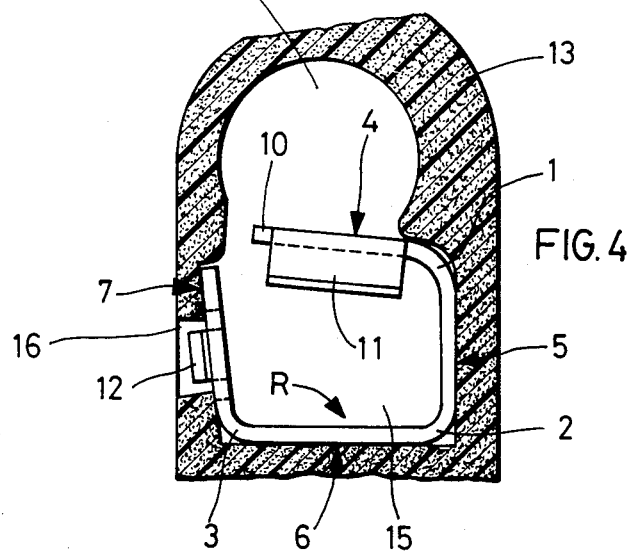

SPRING FOR HINGES OF AUTOMOTIVE VEHICLE SUN SHADES

BACKGROUND OF THE INVENTION

The present invention relates to a spring for hinges of automotive vehicle sun shades.

Springs of the above mentioned general type are known in the art. The known springs are used to provide tightness of support shafts of the hinges of the sun shade. The known springs for this specific use possess some disadvantages which are connected to their manufacture, assembly, and reliability. It is, therefore, believed to be clear that there is a possibility to further improve the springs for the hinges of the sun shades in the above listed aspects.

SUMMARY OF THE INVENTION

Accordingly, it is an object of the present invention of the present invention to provide a spring for hinges of sun shades of automotive vehicles, which avoids the disadvantages of the prior art.

More particularly, it is an object of the present invention to provide a spring of the above mentioned general type, which has greater efficiency and provides easy and reliable assembly of the sun shades.

In keeping with these objects and with others which will become apparent hereinafter, one feature of the present invention resides, briefly stated, in a spring which is formed as a one-piece member bent over through three edges so as to form four portions, wherein two end portions have free ends facing toward one another and forming separate flexible wings, and wherein one flexible wing has a side edge provided with a slightly inclined lug and the wall of the other wing has a hook-shaped claw.

When the spring is designed in accordance with the present invention, it provides a greater efficiency in its function of tightly holding a supporting shaft of hinges of the sun shades.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWINGS

FIG. 1 is a side view of a spring of hinges for automotive vehicle sun shades, in accordance with the present invention;

FIG. 2 is a plane view of the spring in accordance with the present invention;

FIG. 3 is a view showing a section taken along the line III—III in FIG. 1; and

FIG. 4 is a view showing a section of a part of a sun shade, with the inventive spring arranged therein for holding a supporting shaft.

DESCRIPTION OF A PREFERRED EMBODIMENT

A spring for hinges of automotive vehicle sun shades in accordance with the present invention is identified as a whole with reference letter R. It is formed as a one-piece member having a substantially rectangular cross section. The spring is composed of a suitably flexible metal sheet, such as a metal plate or a sheet metal, for example in form of a metal band.

The spring R is successively bent over three edges 1, 2 and 3 at an angle of approximately 90°. Therefore, four portions 4, 5, 6 and 7 are formed. These portions have also a substantially rectangular contour.

Two end portions which are identified with reference numerals 4 and 7 have free edges 8 and 9 which face toward one another. A certain distance is maintained between the free edges 8 and 9 of the portions 4 and 7. As a result of this, the portions 4 and 7 have the shape and properties of flexible wings.

The portion 4 has one side which is identified with reference numeral 10 and is provided at its side with an extension formed as a lug 11. The lug 11 is somewhat inclined toward the center of the spring, preferably with a slight curvature and includes a first formation extending transversely to the free portion or flexible wing 4. The shape of the lug 11 is more clearly shown in FIG. 3.

The other portion identified with reference numeral 7 has an extension formed as a claw 12. The claw 12 engages normally in a non-releasable manner into an opening in a structure in which the spring R is located and is readable as second formation extending transversely to the other free portion or flexible wing 7.

FIG. 4 clearly illustrates the use of the spring R. A part of a sun shade 13 for an automotive vehicle is provided with a cavity or housing 14 which is intended to receive a supporting shaft of the sun shade. The supporting shaft is not shown in the drawings.

The sun shade 13 is also provided with a receiving chamber 15 for accommodating the spring R. As can be seen from FIG. 4, once the spring is set into position, its unauthorized removal is prevented by the claw 12. The claw 12 engages into an opening 16 which is formed in the inner wall of the sun shade 13.

The assembly of the sun shade with the use of the spring R is performed in the following manner.

The supporting shaft of the sun shade which is a component of a hinge for the sun shade, is inserted just above the portion 4, while the inclined lug 11 facilitates this insertion. The size of the respective parts, and in particular the size of the cavity 14 and the spring R has been selected so that the insertion of the supporting shaft is performed by overcoming the resistance of the portion 4, which therefore is bent toward the center. The portion 4 maintains a permanent pressure against the supporting shaft and therefore insures the maintenance of the desired position of the supporting shaft and the sun shade as a whole within the range of positions to be assumed during turning. The range of the above positions is very broad when the supporting shaft is fully cylindrical. The above described design of the spring provides a very high degree of guarantee of a stability of the sun shade. In some cases the supporting shaft has planes intended to provide pre-established positions, to achieve the reliability of the positions is of a maximum degree. The last mentioned solution is used when the sun shades are to be used on vehicles with more rigid suspension than usual, or on vehicles intended to frequently circulate on uneven terrain or road surfaces in poor conditions.

It will be understood that each of the elements described above, or two or more together, may also find a useful application in other types of constructions differing from the types described above.

While the invention has been illustrated and described as embodied in a spring for hinges of automotive vehicle sun shades, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A spring for hinges of automotive vehicle sun shades, comprising a body part which is formed as a one-piece member, said member being bent over three edges so as to form four portions, two of said portions having free ends which face toward one another and are spaced from one another so as to form separate flexible wings, one of said flexible wings being provided with means for facilitating insertion of a supporting shaft, the other of said flexible wings being provided with means for engaging with an outer structure, said means for facilitating insertion including a first formation extending transversely to said one flexible wing, said means for engaging including a second formation extending transversely to said other flexible wing and transversely to said first formation.

2. A spring as defined in claim 1, wherein said member is formed as a substantially rectangular metal sheet.

3. A spring as defined in claim 1, wherein said three edges of said member are formed as substantially rounded edges.

4. A spring as defined in claim 1, wherein said four portions of said member are formed as substantially rectangular portions.

5. A spring as defined in claim 1, wherein said one flexible wing has two side edges, said first formation of said means for facilitating insertion of a supporting member being formed as a lug provided on one of said side edges of said one flexible wing.

6. A spring as defined in claim 1, wherein said other flexible wing has a wall, said second formation of said means for engaging an outer structure including a hook-shaped claw provided on said wall of said other flexible wing.

7. A spring for hinges of automotive vehicle sun shades, comprising a body part which is formed as a one-piece member, said member being bent over three edges so as to form four portions, two of said portions having free ends which face toward one another and are spaced from one another so as to form separate flexible wings, one of said flexible wings being provided with means for facilitating insertion of a supporting shaft, the other of said flexible wings being provided with means for engaging with an outer structure, said one flexible wing having two side edges, said means for facilitating insertion of a supporting member being formed as a lug provided on one of said side edges of said one flexible wing.

8. A spring as defined in claim 7, wherein said lug extends with a slight inclination from said one side edge of said one flexible wing.

9. A spring for hinges of automotive vehicle sun shades, comprising a body part which is formed as a one-piece member, said member being bent over three edges so as to form four portions, two of said portions having free ends which face toward one another and are spaced from one another so as to form separate flexible wings, one of said flexible wings being provided with means for facilitating insertion of a supporting shaft, the other of said flexible wings being provided with means for engaging with an outer structure, said other flexible wing having a wall, said means for engaging an outer structure including a hook-shaped claw provided on said wall of said other flexible wing.

* * * * *